US006825152B2

(12) United States Patent
Green

(10) Patent No.: US 6,825,152 B2
(45) Date of Patent: Nov. 30, 2004

(54) METHOD FOR CREATING DENSE DRILLING FLUID ADDITIVE AND COMPOSITION THEREFOR

(75) Inventor: Ban D. Green, New Iberia, LA (US)

(73) Assignee: Grinding & Sizing Co., Inc., Lufkin, TX (US)

( * ) Notice: Subject to any disclaimer, the term of this patent is extended or adjusted under 35 U.S.C. 154(b) by 0 days.

(21) Appl. No.: 09/805,316

(22) Filed: Mar. 13, 2001

(65) Prior Publication Data

US 2002/0128158 A1 Sep. 12, 2002

Related U.S. Application Data

(63) Continuation-in-part of application No. 09/360,558, filed on Jul. 26, 1999, now abandoned.
(60) Provisional application No. 60/189,007, filed on Mar. 13, 2000.

(51) Int. Cl.[7] ................................................. C09K 7/00
(52) U.S. Cl. ...................... 507/104; 507/107; 507/108; 507/110; 507/111; 507/112; 507/113; 507/140; 507/906; 175/72
(58) Field of Search ............................... 507/104, 107, 507/108, 110–113, 140, 906; 175/72

(56) References Cited

U.S. PATENT DOCUMENTS

| | | |
|---|---|---|
| 2,119,829 A | 6/1938 | Parsons |
| 2,642,268 A | 6/1953 | Armentrout ................. 255/1.8 |
| 2,749,308 A | 6/1956 | Beckum |
| 2,836,555 A | 5/1958 | Armentrout ................. 252/8.5 |
| 3,518,185 A | 6/1970 | Roemer et al. |
| 3,629,102 A | 12/1971 | Lummus et al. |
| 4,217,965 A | 8/1980 | Cremeans |
| 4,247,403 A | 1/1981 | Foley et al. |
| 4,428,843 A | 1/1984 | Cowan et al. |
| 4,428,844 A | 1/1984 | Wagener |
| 4,462,470 A | 7/1984 | Alexander et al. ............ 175/72 |
| 4,836,940 A | 6/1989 | Alexander ............... 252/8.512 |
| 5,004,553 A | 4/1991 | House et al. |
| 5,065,820 A | 11/1991 | Bloys et al. ................. 166/291 |
| 5,071,575 A | 12/1991 | House et al. |
| 5,076,944 A | 12/1991 | Cowan et al. |
| 5,118,664 A | 6/1992 | Burts, Jr. |
| 5,147,852 A | 9/1992 | Cowan et al. |
| 5,363,928 A | 11/1994 | Wittliff |
| 5,801,127 A | 9/1998 | Duhon, Sr. |
| 6,630,429 B1 * | 10/2003 | Cremeans et al. .......... 507/104 |

* cited by examiner

Primary Examiner—Philip C. Tucker
(74) Attorney, Agent, or Firm—Bracewell & Patterson LLP

(57) ABSTRACT

A dense drilling fluid additive used to control lost circulation, fluid loss and/or seepage loss of drilling fluid during drilling operations is disclosed. Such additive is formed from ground base materials, such as inorganic matter, and may be used to manage the rheological properties of drilling fluid.

11 Claims, No Drawings

METHOD FOR CREATING DENSE DRILLING FLUID ADDITIVE AND COMPOSITION THEREFOR

This application is a continuation-in-part application of U.S. Ser. No. 09/360,558, filed Jul. 26, 1999, now abandoned and claims the benefits of provisional application of U.S. Ser. No. 60/189,007, filed Mar. 13, 2000.

BACKGROUND OF THE INVENTION

1. Field of the Invention

The invention relates to an improved additives for drilling fluid during drilling operations. In particular, the additive is formed such that the additive can be incorporated into the drilling fluid with much greater speed, reduction of dust and reduction of volume compared to powdered or ground additives of similar components.

2. Description of the Prior Art

Various drilling fluid additives are known in the art. They are used as lost circulation additives, fluid loss additives, seepage loss additives, viscosifiers, thinners, shale control agents, weighting agents, lubricants, cleaning agents, flocculants, dispersants, anti-foaming agents, buffering or pH control agents and other uses. Some additives perform more than one of these functions or other functions useful in drilling activities. While the types of additives used for this purpose range from organic products to mineral products to polymers, most of these additives are introduced into the drilling fluid as a powder. There are numerous disadvantages to the use of a powder. The primary disadvantage is that the additive is very light causing it to mix slowly with the highly viscous drilling fluid. In drilling operations, speedy incorporation of the additives into the mud and circulation down through the hole is essential and affects the profitability and occasionally the safety of the operation. To overcome this disadvantage of slow incorporation, hoppers have been designed with cyclones, venturis and jets to enhance mixing and to attempt to pull the additives from the hopper into the fluid at a higher rate. In spite of the improvement in technology, mixing is still relatively slow. The flow through the cyclones is slow, clogging occurs, and dust becomes a problem. In certain areas of the world where a zero emission standard is in place, dust is a particular problem. Regardless of the level of emission standards, dust creates a hazard for the workers.

Another problem of traditional powdered additives arises due to the general change in drilling operations. There is a trend toward drilling in deeper water with bigger rigs thus requiring larger volumes of mud and increased weights of mud. Thus, the muds being used tend to be more expensive muds and synthetic oils utilizing greater quantities of weighting material. These factors create a need for larger volumes of additives for various purposes. However, storage space, particularly on an offshore rig, is a limiting factor. In the search for a better additive, huge numbers of organic substances have been tested for their efficiency as lost circulation and seepage control agents. In U.S. Pat. No. 4,217,965 issued to Jim G. Cremeans, it is disclosed that discarded cattle feed can be used as an additive. This organic material is made from cottonseed hulls in combination with cottonseed meal, bentonite, some cottonseed lint and a surface active agent. To make feed for the cattle, these components are heated and then compressed and extruded as pellets. Cremeans discloses that the advantage of using discarded cattle feed is that it avoids the steps of grinding, shredding, and pretreatment processes required when using other organic waste products. The surface active ingredient in the pellet acts as a wetting agent to improve mixing time without further chemical additions. The cattle pellets are relatively dense and thus require less storage space. A major disadvantage of the cattle feed is the inclusion of high protein and carbohydrate content in the cotton meal, which degrades quickly and creates an operating or environmental hazard. A shortcoming of the cattle feed is that it does not immediately break down upon contact with the mud but instead maintains its shape and structure as it is added to the mud. They only begin to breakdown when they are well down the drilling hole.

There is a need to provide additives in a form that minimizes space required for storage and/or shipping. There is a need to provide additives in a form which mixes with the drilling fluid at substantially faster speeds. There is a need for a low or no-dust alternative for delivery of the additives to the drilling fluid. It is an object and a goal of this invention to meet these and other needs. It is an object and a goal of this invention to provide an additive that is quickly and efficiently distributed throughout the drilling fluid upon introduction. These and other objects of the invention will appear to one skilled in the art as the description thereof proceeds.

BRIEF SUMMARY OF THE INVENTION

The present invention discloses a method for creating a dense drilling fluid additive for use in drilling fluids as well as the composition therefor. A method of creating a dense drilling fluid additive from a base material for use in drilling operations includes grinding of the base material or acquiring the base material in a ground form. The ground base material is heated and pressure is applied. This cause the material to compact into a dense form which is forced through apertures creating a pelletized dense drilling fluid additive.

While many lost circulation and seepage control materials are appropriate, a preferred embodiment includes organic material as the lost circulation and seepage control material. This pelletized dense additive for use in drilling operations made from a ground lost circulation and seepage control material that is compressed into a pellet has a density substantially greater than that of the ground lost circulation and seepage control material before being compressed.

While many additives are appropriate, a preferred embodiment includes the use of one or more of the following base materials: lignites, leonardites, lignin-based powders, bitumens, lignosulfonates, asphalts, clays, polyacrylate homopolymers and copolymers, cellulosic polymers, xanthan gums, metal silicates, starches, guar gum, cellulosic fibers, fatty acids, amphoterics, carboxymethyl cellulose, welan gum, hydrocarbon resins, barite, hematite, hydroxyethylcellulose, chlorides, bromides, polyphosphates, zinc, gilsonite, graphite, and coke. These and other base materials are known for use in drilling fluid operations as viscosifiers, thinners, weighting agents, lubricating agents, shale control agents, anti-foaming agents, buffering agents, flocculants, dispersants and the like. The dense drilling fluid additive compressed into a pellet has a density substantially greater than that of the base material in its powder form before being compressed.

Of the organic lost circulation and seepage control materials available to produce the dense drilling fluid additive, a preferred embodiment includes a cellulosic material. In particular, one or more of the following in combination are preferred: ground wood, pine bark, fruit pomace, vegetable pomace, yellow pine, pine bark, corn cobs, peanut hulls, pecan piths, almond shell, corn cob outers, bees wings, cotton burrs, oat hulls, rice hulls, seed shells, sunflower, flax, linseed, cocoa bean, feathers, peat moss, jute, flax, mohair, wool, paper, sugar cane, bagasse, sawdust, bamboo, cork, popcorn, tapioca, and grain sorghum.

The pelletized dense additive, while characterized by increased density, is preferably in the range of ⅛ inch to ¾ inch for diameter and a range of ⅛ inch to 1 inch for length. The density of the additive ranges widely according to the base material, with the preferred density being the highest ratio of compression achievable based on the characteristics of the material. Many organic materials can be compressed to between two and three times the density of the ground material.

This invention also encompasses a method of performing drilling operations wherein a drilling fluid is circulated in a well being drilled in the ground including grinding a base material to produce granules, heating the granules, pressing the heated granules through apertures such that pellets are formed that are of substantially greater density than the base material, and adding the pellets to the drilling fluid for circulation in the well. The heating is typically a result of the friction produced during the pressing process however, the heat produced in grinding is determined by the characteristics of the particular materials. If sufficient heat is not produced during the grinding process, heat input is added. In the situation where naturally occurring binding agents are not present in the base material, the preferred embodiment includes minimizing the amount of heat produced by the process and adding a binding agent to maintain the dense drilling fluid additive in a pellet form. Examples of preferred binding agents include clays, guar gum, lignosulfonate or wood sugar, starch and the like.

Frequently, base materials are already in a ground form. The method of creating a dense additive from such a base material includes obtaining the ground material and compressing the ground material into a pellet such that the pellet has substantially greater density than the ground fiber before being compressed.

The structure and method of the present invention as well as other features, advantages, benefits and objects thereof over other structures and methods known in the art can be better understood with reference to the detailed description which follows.

DETAILED DESCRIPTION OF THE INVENTION

The present invention includes many advantages over traditional art. Among such advantages are an increased rate at which additives can be added to drilling fluid, reduced area required for storage and shipping, and reduced or eliminated dust emission. A characteristic of the present invention is that the dense drilling fluid additive immediately begins to hydrate on contact with the drilling fluid. With the quick hydration, the dense drilling fluid additive promptly disperses such that the additive is uniformly distributed through the drilling fluid as the drilling fluid is pumped down the hole. A preferred embodiment includes distributing the dense drilling fluid additive throughout the drilling fluid using a traditional hopper known in the art for mixing non-dense or traditional additives. A typical hopper will have an outlet diameter in the range of 4–6 inches. The pellets are of a size to easily and compactly flow through the outlet. As with the non-dense additives known in the art, the hopper creates a mixing effect to contact the dense drilling fluid additive with the fluid. When necessary, the pellets can be added to the drilling fluid without the use of a hopper. In this case, the pellets will hydrate as they come into contact with the drilling fluid and will immediately break down into fibers or other base material, but it will take longer for the mixing action of pumping the drilling fluid into the hole to uniformly distribute the fibers or base material throughout the fluid. Although not uniform when added in this manner, the additive is readily available to perform its function after being mixed with the drilling fluid at the surface and the Theological properties of the fluid at the surface are consistent with the properties down hole. One of the advantages of use of the densified drilling fluid additive is the substantial or complete reduction of dust during addition to the drilling fluid. Traditional powders added through a hopper create volumes of dust which create a hazard to the environment and to the working personnel. Certain areas, such as the North Sea, have stringent regulations on dust. The use of the densified additive results in a virtually dust-free base additive.

Traditional powder or finely-ground additives, particularly cellulosic additives, have a maximum speed at which they can be introduced into the mud or drilling fluid. This rate of addition is related to the additive's angle of repose that impacts the speed at which the additive can be discharged. While previous attempts to increase speed of introduction have focused on the design of the hopper, including varying outlet size, and the addition of cyclones and other physical aids, the current invention is directed toward reducing the angle of repose of the additive to allow the material to flow faster. The angle of repose relates to how a material will stack and thus relates to the speed at which it will flow. By increasing density of the additive, the angle of repose is reduced allowing the same amount of material to be added to drilling fluid in substantially less time.

The pellets can be made in a variety of shapes and sizes. The preferred size of the pellet depends upon the particular application, such as the diameter of the outlet of the hopper, the materials used to create the pellets and stacking behavior of specific shapes and sizes. The pellets can range from very small dense granules and dense flakes up to several inches. A preferred size is a pellet from ⅛ inch up to ¾ inch in diameter with a length between ⅛ inch and 2 inches. Any apparatus useful for forcing material through apertures can be employed in this invention such as a pellet mill, an extruder and a pug and pin mill. A preferred embodiment includes a belt drive pellet mill, such as the commercially available Ace Pellet Mill from Koppers of Muncy, Pa. This traditional pellet mill includes a feed screw forcing the material into a conditioner chamber. Steam can be injected when necessary into the feeder section or the conditioning chamber. A roll assembly forces the material through a die at the end of the conditioning chamber. Capacity is based in part on hole size of the pellet die. The force generated by such a pellet mill is generally sufficient to achieve maximum or optimum compressibility of the ground material. Also, the heat generated as a result of the friction is generally sufficient to release oils or binders of those materials containing such components without the addition of heat. Other methods of compressing the ground material can also be used. Likewise, it is encompassed within the invention that the grinding and compressing processes can also be performed in one apparatus.

The base materials useful for the present invention are any material that performs the function of a lost circulation additive and/or a seepage control agent or additives that are useful in controlling the rheological properties of the drilling fluid. For example, additives are used to optimize viscosity, shale control, seepage loss, weighting, fluid loss, lubrication, cleaning, flocculation, anti-foaming, buffering and the like. Base materials can be useful for more than one purpose. For example, any non-soluble base material also acts as a seepage control material. A combination of base materials is also useful. A preferred embodiment includes a combination of two or more base materials with one of the base materials being an organic material. As noted, the organic materials typically contain oils that are released during the heating and pressing treatment. At least one of the base materials is somewhat compressible to allow the pellet formed from such material to be denser than the base material prior to compression. Some of the organic materials useful as base material in this invention include cellulosic products such as ground wood, pine bark, pomace or pulp of fruits and/or vegetables, yellow pine, pine bark, corn cobs, peanut hulls, which is also a carrier for insecticides, pecan piths, almond shell, corn cob outers, bees wings, cotton burrs, kenaf, sillage, oat hulls, rice hulls. Other representative organic materials include seed shells, sunflower, flax, linseed, cocoa bean, feathers, peat moss, jute, flax, mohair, wool, paper, sugar cane, bagasse, sawdust, bamboo, cork, popcorn, tapioca, and grain sorghum. Many assorted organic materials useful as lost circulation additives are also appropriate for this invention including carrageenan guam, guar gum, and other soluble gums.

Organic materials frequently contain natural binders such as lignin sulfonates, wood sugar, oils or other binding agents. With most organic materials useful as additives, to create the dense drilling fluid additive, the material is exposed to friction through a grinding process to produce a fine material. This ground material is then subjected to pressure that forces the material with its oil through small openings or aperture to create pellets. The process of pressing produces heat that, in turn, releases oils and other readily liquified components of the material. These oils and other materials act to bind the material such that it is maintained as a pellet. When inorganic materials alone are used or when insufficient oil is present for binding of the pellets, oil or other binder can be added to the base materials. Likewise, in cases where the oil contained within the material is of a higher melting point, additional heat can be input.

The pellet can be formed of one or more additives effective as lost circulation additives or seepage control agents. Also, the step of applying friction to produce a fine material can produce material of various sizes such that the pore openings of the permeable formation are effectively plugged without adverse effects. Thus, the particle distribution in the drilling fluid resulting from the pellet of the invention not only ensures an even mix of additive, but an even mix of various sizes of particles of additive should a mix of granule sizes be desirable.

Among the inorganic materials useful in this invention, mineral components are readily available, such as calcium carbonate, mica, diatomaceous earth, Fuller's earth and other silicates, activated charcoal, bauxite, alumina gel, graphite, gilsonite and the like. Such materials are frequently provided in fiber or ground form. Carbonate may be used alone or in combination with other desirable additives. The effect of adding carbonate to organic additives is an improved acid solubility. This also results in a pellet of increased density. Also useful are plastics such as thermosets, thermoplastics and rubber compounds including melamine, polyvinylchloride (PVC) and cellophane. These plastics may be ground into granules or powders.

Other materials useful for managing the rheological characteristics of drilling fluid include the rheological additives of lignites containing calcium hydroxide, leonardite, leonardite with potassium, leonardite with gyp, organophilic leonardite, lignin-based powders, bitumens. Also useful are lignosulfonates, including those with chrome or chrome-free, and those containing calcium, iron, tin, zinc and other heavy metals. Asphalt and various forms of asphalts are included in as rheological additives, including sodium sulfonate asphalt and potassium sulfonate asphalt. Rheological additives also include various clays including organophilic clays, attapulgite clays, montmorillonite clays, kaolinite clays and calcined clays. Polyacrylate powders, polyacrylamide homopolymers and copolymers, polyanionic cellulose, cellulosic polymers and the like are also rheological additives useful in the invention. Xantham gums, metal silicates, starches, including corn, sugarbeet, wood and potato starches, and guar gum are included. Fatty acids, including tall, refined, unrefined, and polyaminated are also rheological additives. Other Theological additives include amphoterics such as aluminum salts and the like, carboxymethyl cellulose, sodium carboxymethyl cellulose, welan gum, hydrocarbon resins, barium sulfate, hematite, hydroxyethylcellulose, sodium chlorides, calcium chloride, potassium chloride, bromides, polyphosphate, sodium, calcium, zinc, gilsonite, graphite, petroleum coke and calcine coke. Fiberous insulation material such as Rockwool insulation may be used as Theological additives.

A substantial increase in density is observed between the base materials useful in this invention and the dense drilling fluid additive. A typical example includes a cellulosic additive with a density of 10 lbs/cf. Upon pelletizing this additive with mica, the resulting density is about 17 lbs/cf. Substantial greater density is defined as a non-trivial increase in density as compared to the density of the raw materials used to create the denser additive. Thus, while the addition of a component such as mica would increase the density of the mixture of the raw materials, compression into a pellet substantially increases the density of the mixture. The increase in density is directly related to the size and shape of the particles being compressed and the nature of the material. Thus, for example, increasing of density from 10 lbs/cf to 11 lbs/cf for a specific material can be a substantial increase in density creating a faster flow of the material out of the hopper with reduction of dust. Preferred materials for use in the invention include those which have low density and are highly compressible. In addition to the advantages listed above relating to speed of incorporation, such low density materials can be highly compressed resulting in a product which requires far less space for storage. For example, corn cobs can be compressed into a pellet approximately double the density of corn cobs in ground form.

The inorganics after grinding show an increased density as well, although many do not show the same magnitude of compression as observed with organic, cellulose-containing base materials. The reduction of dust experienced with inorganics of this invention is a strong advantage.

With additives such as lignite, graphite and gilsonite, the advantage achieved through application of the current invention is largely the ability to avoid dust. These items are extremely dirty, black materials creating great quantities of dust. Not only do these dusts create a pollution problem, but they are health hazards to those working with the material as well. Reduction of dust is a significant advantage.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense. For example, the dense drilling fluid additive can also include insecticides, biocides or other biological operatives to reduce susceptibility to various types of degradation or to repel pests. While one of the advantages to this invention is to use agricultural byproducts as a base material thus minimizing what would otherwise be a waste product, some agricultural products and other base materials useful to this invention are provided in a ground form. The method of creating a dense drilling fluid additive from such a base stock includes obtaining the ground base material. Obtaining the material in ground form as opposed to grinding the material is also encompassed within this invention.

What is claimed is:

1. A pelletized dense additive for lost circulation, seepage control, fluid loss and control of lubricity, viscosity and rheology in drilling operations, the additive comprising:

a plurality of comminuted particles formed of base material defining a ground raw base material, the base material being selected from the group consisting of raw organic materials, inorganic materials and combinations thereof, the ground raw base material being compressed and shaped to define a pellet body having a density substantially greater than the plurality of untreated comminuted particles of base material, the pellet body being operable to begin to disperse into the plurality of particles within a drilling fluid directly upon introduction to the drilling fluid such that the additive is substantially uniformly distributed through the drilling fluid when the drilling fluid is in the mud pit, the pellet having only one base material, the pellet when dispersed in the drilling fluid is operable to inhibit lost circulation, seepage and fluid loss of the drilling fluid.

2. The pelletized dense additive of claim 1 wherein the base material is selected from the group consisting of lignites, leonardites, lignin-based powders, bitumens, asphalts, clays, cellulosic polymers, metal silicates, starches, guar gum, cellulosic fibers, fatty acids, welan gum, hydrocarbon resins, barite, hematite, chlorides, bromides, polyphosphates, zinc, gilsonite, graphite, coke and mixtures thereof.

3. The pelletized dense additive of claim 1 wherein the base material is selected from the group consisting of calcium carbonate, mica, diatomaceous earth, Fuller's earth and other silicates, bauxite, alumina gel, graphite, gilsonite and mixtures thereof.

4. The pelletized dense additive of claim 1 wherein the base material is selected from the group consisting of leonardite, lignin-based powders, bitumens and mixtures thereof.

5. The pelletized dense additive of claim 1 wherein the base material is asphalt.

6. The pelletized dense additive of claim 1 wherein the base material is selected from the group consisting of clays, attapulgite clays, montmorillonite clays, kaolinite clays, calcined clays and mixtures thereof.

7. The pelletized dense additive of claim 1 wherein the base material is selected from the group consisting of cellulosic polymers.

8. The pelletized dense additive of claim 1 wherein the base material is selected from the group consisting of metal silicates, vegetable starches, fatty acids, cellulose compounds, barium sulfate, hematite, sodium chlorides, calcium chloride, potassium chloride, bromides, polyphosphate, sodium, calcium, zinc, gilsonite, graphite, petroleum coke, calcine coke and mixtures thereof.

9. The pelletized dense additive of claim 1 further comprising a binding agent selected from the group consisting of clays, guar gum, starch and mixtures thereof.

10. The pelletized dense additive of claim 1 wherein the base material is selected from the group consisting of ground wood, pine bark, fruit pomace, vegetable pomace, yellow pine, pine bark, corn cobs, peanut hulls, pecan pits, almond shell, corn cob outers, bees wings, cotton burrs, kenaf, sillage, oat hulls, rice hulls, seed shells, sunflower, flax, linseed, cocoa bean, feathers, peat moss, jute, flax, mohair, wool, sugar cane, bagasse, sawdust, bamboo, cork, popcorn, tapioca, grain sorghum and soluble gums.

11. The pelletized dense additive of claim 1 wherein the pellets have a diameter substantially in the range of 1/8 inch to 3/4 inch and a length substantially in the range of 1/8 inch to 2 inches.

* * * * *